(12) United States Patent
Rangel-Ruiz et al.

(10) Patent No.: US 12,284,064 B1
(45) Date of Patent: Apr. 22, 2025

(54) SYSTEMS AND METHODS FOR DIRECTED TRANSMISSION AND RECEPTION OF WIRELESS POWER AND BROADBAND DATA

(71) Applicant: NoiseFigure Research, Inc, Renton, WA (US)

(72) Inventors: Carlos Rangel-Ruiz, Renton, WA (US); Jerry Lopez, Renton, WA (US); Alexander William Boothby, Renton, WA (US)

(73) Assignee: NoiseFigure Research, Inc, Lubbock, TX (US)

( * ) Notice: Subject to any disclaimer, the term of this patent is extended or adjusted under 35 U.S.C. 154(b) by 0 days.

(21) Appl. No.: 18/907,906

(22) Filed: Oct. 7, 2024

(51) Int. Cl.
  *H04L 27/26* (2006.01)
  *H04L 5/00* (2006.01)

(52) U.S. Cl.
  CPC ........ *H04L 27/2602* (2013.01); *H04L 5/0007* (2013.01)

(58) Field of Classification Search
  CPC ........... H04L 27/26025; H04L 27/2602; H04L 27/2603; H04L 27/26035; H04L 27/2604; H04L 5/00; H04L 5/0007; H04L 5/001; H04L 5/0005
  See application file for complete search history.

(56) References Cited

U.S. PATENT DOCUMENTS

| | | | |
|---|---|---|---|
| 11,057,249 B1* | 7/2021 | Hawkes | H04L 27/0014 |
| 12,003,350 B1* | 6/2024 | McCormick | H04B 7/18517 |
| 2006/0274852 A1* | 12/2006 | Trachewsky | H04L 1/0002 375/295 |
| 2012/0182895 A1* | 7/2012 | Jwa | H04L 5/0048 370/252 |
| 2012/0327830 A1* | 12/2012 | Hamaguchi | H04L 5/0039 370/329 |
| 2014/0341048 A1* | 11/2014 | Sajadieh | H04L 5/0053 370/252 |

OTHER PUBLICATIONS

S. Lawrence Marple, Computing the Discrete-Time 'Analytic' Signal Via FFT, IEEE Transactions on Signal Processing (47)(9), dated Sep. 30, 1999, 4 pages.

(Continued)

*Primary Examiner* — Khanh C Tran
(74) *Attorney, Agent, or Firm* — Flagship Patents; Andre Grouwstra; Sikander M. Khan

(57) ABSTRACT

A transmitter system includes a mapper that maps data bits and power information to N subcarriers. A first-level modulator converts the mapped information of subcarriers into subcarrier specifications, defining their amplitude and phase (or real and imaginary amplitudes). An orthogonal subcarrier generator, for example an IFFT, calculates N successive values of baseband real and imaginary signals. A second-level modulator multiplies the baseband signals with in-phase and quadrature intermediate frequency (IF) components to generate an orthogonal IF signal. A single-sideband (SSB) prep unit may remove the lower or upper sideband. A beam former modifies the phase and/or the amplitude of the orthogonal IF signal for transmission through multiple sub-antennas in a phased array antenna.

14 Claims, 7 Drawing Sheets

(56) References Cited

OTHER PUBLICATIONS

Matthew S. Gast, 802.11ac: A Survival Guide, O'Reilly Publication, published on Jul. 23, 2013, 154 pages.
Steven A. Tretter, Chapter 7 Single-Sideband Modulation and Frequency Translation, University of Maryland, dated 2003, 33 pages.
ETSI, Digital Video Broadcasting (DVB); Framing structure, channel coding and modulation for digital terrestrial television European Broadcasting Union Union Européenne de Radio-Télévision EBU, dated Jan. 2009, 66 pages.

* cited by examiner

SYSTEMS AND METHODS FOR DIRECTED TRANSMISSION AND RECEPTION OF WIRELESS POWER AND BROADBAND DATA

BACKGROUND

Technical Field

The disclosed implementations relate generally to systems and methods used in wireless transmission and reception of power and data.

Context

Wireless transmission of power has seen increased interest over the last decade. Data is transmitted in ever increasing bandwidths. Existing solutions for the simultaneous transmission of power and broadband data have suffered from interference of the data by the power.

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

BRIEF DESCRIPTION OF THE DRAWINGS

The technology will be described with reference to the drawings, in which.

Figure 1:
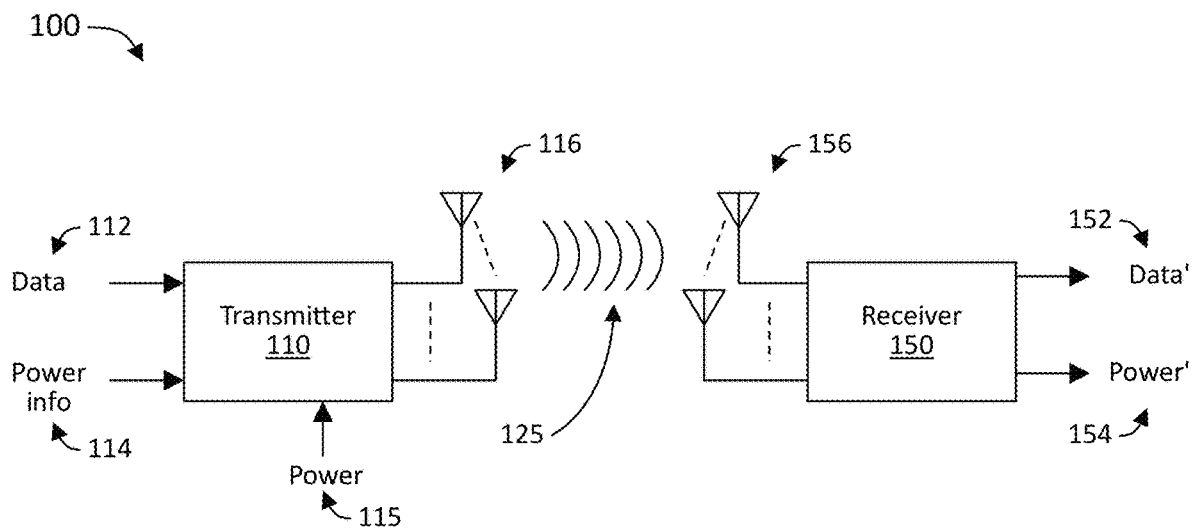
FIG. 1 illustrates an example system with a transmitter with spatial directivity and a receiver. The system is capable of wirelessly transferring broadband data and power from the transmitter to the receiver.

In the figures, like reference numbers may indicate functionally similar elements. The systems and methods illustrated in the figures—and described in the Detailed Description below—may be arranged and designed in a wide variety of different implementations. Neither the figures nor the Detailed Description are intended to limit the scope as claimed. Instead, they merely represent examples of different implementations.

DETAILED DESCRIPTION

Researchers have developed and tested many systems for the wireless transfer of energy along with broadband data. Wireless transmission of digital data has been practiced for many decades, and data transfer bandwidths continue to increase with the availability of ever higher frequency bands in the radio spectrum. With the advent of 6G and 7G transmission systems, and radio spectra above 60 GHz, very high bandwidths may become available, for example wherein the data bits have a bandwidth of more than one hundred megabits per second (100 Mbps) or even more than one gigabits per second (1 Gbps) and wherein the emitted signal occupies a spectrum of at least ten megahertz (10 MHz). For the sake of efficiency, especially when a signal needs to transfer both data and energy, beamforming is essential. However, systems developed so far have suffered from interference of the power with the data.

Implementations provide wireless transmission with spatial directivity of wideband data and one or more select-tone continuous waveforms (CWs) for wireless power charging (WPC). Spatial directivity refers to the radiation of (data and/or) energy in a specific direction. An electronic system that can transmit or receive in a specific direction through beam steering is commonly known as a transmitter or receiver beamformer. Three types of beamformers are known in the art: analog, digital, and hybrid beamformers. They each have their advantages and disadvantages, but all can be used in implementations.

Beamforming is achieved with a phased array antenna, i.e., an array of sub-antennas whose signals add up in some directions and cancel in other directions. Two sub-antennas cancel their signals in the direction of reception when those signals are of opposite polarity, that is, if their signals have opposite phase. Their signals reinforce each other if they have the same polarity, that is, if their signals have the same phase. For example, in the direction of the line through the two sub-antennas, signals amplify each other if the distance between d the sub-antennas equals a whole integer N times a signal's wavelength A, or d=N A. The signals cancel each other if the distance d equals the half wavelengths in between, or d=(2N−1) λ/2. Thus, the direction in which signals (partially or fully) amplify or cancel depends on the wavelength, i.e., on the signals' frequency, and the physical arrangement of the sub-antennas. Directivity may be rotated by introducing a phase difference between the signals on the two sub-antennas. By using more than two sub-antennas, a phased array antenna can further increase directivity in the radiated pattern to increase a signal in the direction(s) needed and reduce it in other directions.

When there are many sub-antennas in the array, complicated patterns can be achieved, including patterns that resemble beams in certain directions. Beams can be dynamically created by phase shifting the signals being transmitted by the antennas or being received by the antennas. Phase shifting can be achieved by many different electronic circuits, including those that delay signals, and those that generate signals with a specific phase.

One technology to transmit many signals and/or power in a tight frequency spectrum, and thus with a high spectral efficiency, is orthogonal frequency division multiplexing (OFDM). OFDM uses multiple subcarriers spaced at equal frequency distances and sends data symbols at least for a duration with which the frequency distance becomes orthogonal. For example, for a one-second symbol duration, subcarriers can be spaced at 1 Hz intervals. For a 3.2 microseconds OFDM symbol duration, subcarriers can be spaced at 312.5 kHz intervals, etc. Information is encoded in the relative amplitude and phase of each subcarrier. While OFDM can provide excellent protection against interference because the subcarriers are orthogonal to each other, beamforming can be complex if the OFDM system has many subcarriers and the phased array antenna has many sub-antennas. Beamforming with conventional linear-phase filters may be inaccurate and may be difficult to change dynamically.

The technology disclosed herein uses a first level of modulation with OFDM (or similar technology that employs multiple subcarriers that are orthogonal to each other) to simultaneously transmit data and power, and a second level double-sideband (DSB) or single-sideband (SSB) amplitude modulation to allow beamforming with a phased array antenna to simultaneously transmit the data and/or power to multiple clients. The first modulation level preserves orthogonality, which eliminates or greatly reduces interference between the transmitted power and data, and the second modulation level, which uses a single carrier frequency, allows for efficient beamforming.

Terminology

As used herein, the phrase "one of" should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, or C" or the phrase "one or more of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object merely refers to different instances or classes of the object and does not imply any ranking or sequence.

The terms "comprising" and "consisting" have different meanings in this patent document. An apparatus, method, or product "comprising" (or "including") certain features means that it includes those features but does not exclude the presence of other features. On the other hand, if the apparatus, method, or product "consists of" certain features, the presence of any additional features is excluded.

The term "coupled" is used in an operational sense and is not limited to a direct or an indirect coupling. "Coupled to" is generally used in the sense of directly coupled, whereas "coupled with" is generally used in the sense of directly or indirectly coupled. Coupled in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term "connected" is used to indicate a direct connection, such as electrical, optical, electromagnetic, or mechanical, between the things that are connected, without any intervening things or devices.

The term "configured" to perform a task or tasks is a broad recitation of structure generally meaning having circuitry that performs the task or tasks during operation. As such, the described item can be configured to perform the task even when the unit/circuit/component is not currently on or active. In general, the circuitry that forms the structure corresponding to configured to may include hardware circuits, and may further be controlled by switches, fuses, bond wires, metal masks, firmware, and/or software. Similarly, various items may be described as performing a task or tasks, for convenience in the description. Such descriptions should be interpreted as including the phrase configured to.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B". This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase based on is thus synonymous with the phrase based at least in part on.

The terms "substantially", "close", "approximately", "near", and "about" refer to being within minus or plus 10% of an indicated value, unless explicitly specified otherwise.

The following terms or acronyms used herein are defined at least in part as follows:

"ASIC"—application-specific integrated circuit
"BB"—baseband
"CGRA"—coarse-grained reconfigurable architecture
"CMOS transistor"—complementary metal-oxide-semiconductor transistor
"DAC"—digital-to-analog converter
"DFT"—discrete Fourier transform
"DSB"—double sideband
"FET"—field-effect transistor
"FFT"—fast Fourier transform
"FPGA"—field-programmable gate array
"GAAFET"—gate all-around FET
"HBT"—heterojunction bipolar transistor
"IC"—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

"IDFT"—inverse discrete Fourier transform
"IFFT"—inverse fast Fourier transform
"IF"—intermediate frequency
"IFFT"—inverse fast Fourier transform
"JFET"-junction FET
"LDPC"—low-density parity check
"Marple's method"—a method of removing negative frequency components from a signal, as described in "Computing the discrete-time 'analytic' signal via FFT," by S. L. Marple Jr, IEEE Transactions on Signal Processing, Volume 47, September 1999.
"MCM"—multi-chip module
"MESFET"—metal-semiconductor field-effect transistor
"MOS transistor"—metal-oxide-semiconductor transistor
"NMOS transistor"—n-type MOS transistor
"OFDM"—orthogonal frequency division multiplexing. A technology that modulates data on multiple closely spaced subcarriers that are orthogonal to each other.
"PAM"—pulse amplitude modulation
"PCB"—printed circuit board
"PMOS transistor"—p-type MOS transistor
"QAM"—quadrature amplitude modulation
"QPSK"—quad phase shift keying
"RF"—radio frequency
"SSB"—single sideband Implementations FIG. 1 illustrates an example system 100 with a transmitter 110 with spatial directivity and a receiver 150. The system is capable of wirelessly transferring broadband data 112 and power 115 from the transmitter 110 to the receiver 150. Transmitter 110 receives data 112 and power information 114 and processes the data 112 to be transmitted and power information 114 that specifies transmission of power 115 via phased array antenna 116 and electromagnetic beam 125 to receiver 150. Receiver 150, which may also have a phased array antenna, receives electromagnetic beam 125, decodes its signals and harvests (at least a part of its power, to recreate recovered data 152 and deliver harvested power 154. In a robust implementation and under adequate transmission and reception conditions, recovered data 152 equals data 112 close to 100% of the time and harvested power 154 is a reasonable portion of power 115. Adequate transmission and reception conditions may include a line-of-sight between phased array antenna 116 and phased array antenna 156, sufficiently favorable atmospheric conditions, and a distance between phased array antenna 116 and phased array antenna 156 that allows harvesting a sufficient part of the transmitted power 115 and recovery of the transmitted data 112.

Figure 2:
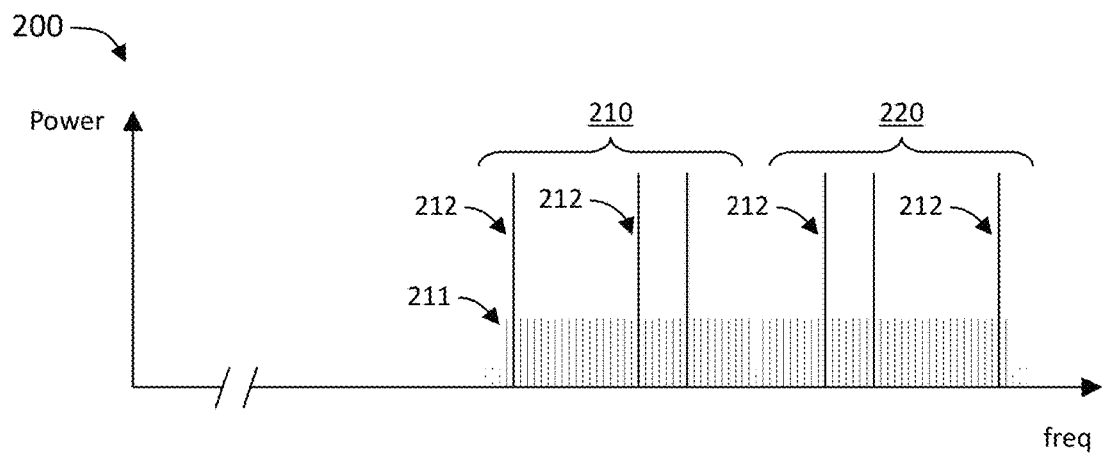
FIG. 2 illustrates an example double-sideband (DSB) spectrum that the transmitter may emit towards one or more receiver units.

FIG. 2 illustrates an example double-sideband (DSB) spectrum 200 that the transmitter may emit towards one or more units of receiver 150. Spectrum 200 includes a lower sideband 210 and an upper sideband 220. Both lower sideband 210 and upper sideband 220 include up to N subcarriers, including data subcarriers 211 and one or more power subcarriers 212, where N is greater than 1. Upper sideband 220 carries an OFDM (or similar) spectrum with all encoded information, and lower sideband 210 carries the same OFDM (or similar) spectrum, mirrored versus a radio frequency (RF) carrier, which may have been suppressed (as drawn). Although an implementation doesn't need to suppress the RF carrier, it may do so when it does not use the RF carrier for the transmission of power. In some implementations, power subcarriers 212 may have a constant (relatively high) amplitude, i.e., they are select-tone continuous waveforms, whereas data subcarriers 211 may have a relatively low average amplitude, and a temporary amplitude that depends on the data being transmitted. In other implementations, power subcarriers 212 may have any amplitude, for example based on the needs of an individual recipient or group of recipients. In typical OFDM systems, data carriers have a flat spectrum, because data is thoroughly randomized to reduce channel disturbances and to provide encryption. Another factor adding to the spectrum's flatness is the removal, as much as possible, of redundancy in the data proper. However, OFDM systems add redundancy to combat channel noise, and to enable detection and correction of transmission errors.

An implementation may generate the OFDM spectrum in various ways. A digital implementation may define the phase and amplitude (or real and imaginary components) of each carrier and use an inverse digital Fourier transform (IDFT) or an inverse fast Fourier transform (IFFT) to calculate a real and an imaginary time series with the baseband (BB) version of the spectrum of upper sideband 220. An analog implementation may use a reference frequency as an input to a bank of phase locked loops, each of which creates one of the subcarriers. With current technologies, digital implementations are far less costly and have the advantage that they can be designed to any required mathematical precision. An implementation may use any transform that can generate a signal in the time domain based on a definition in the frequency or similar domain, and vice versa. Examples include the Fourier transform, DFT/IDFT, FFT/IFFT, Laplace transform, wavelet transform, and any other orthogonal frequency-time transform. However, given its present low cost of manufacture and use, examples in this document may show FFT and IFFT implementations, even though other implementations are possible.

DSB amplitude modulation (AM) radio has been demonstrated as early as 1899 (see https://en.wikipedia.org/wiki/Amplitude_modulation and U.S. Pat. No. 775,337, "Wireless Telephone," Roberto Landell de Moura, filed Oct. 4, 1901, issued Nov. 22, 1904) and is still practiced today. However, a disadvantage of DSB AM transmission is its low spectral efficiency, which is never above 50%. This disadvantage was known and understood a long time ago, leading to the development of single-sideband (SSB) radio systems (U.S. Pat. No. 1,449,382 John Carson/AT&T, "Method and Means for Signaling with High Frequency Waves" filed on Dec. 1, 1915; granted on Mar. 27, 1923).

Figure 3:
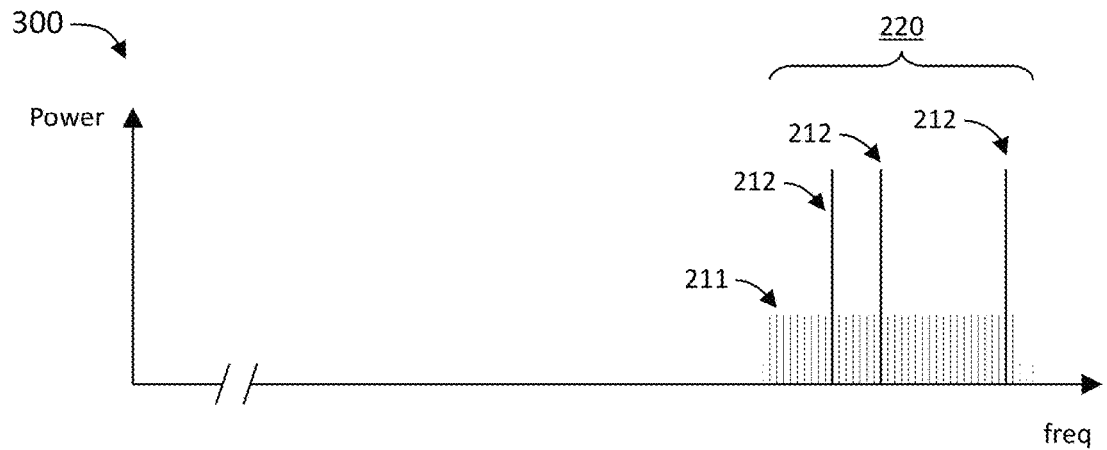
FIG. 3 illustrates an example single-sideband (SSB) radio spectrum that the transmitter may emit towards one or more receiver units.

FIG. 3 illustrates an example SSB spectrum 300 that the transmitter may emit towards one or more units of receiver 150. This example shows upper sideband 220, whereas lower sideband 210 has been suppressed, along with the RF carrier. In a typical implementation, most of the subcarriers are used for data, and one or more subcarriers are used for power. Some other carriers may be used as pilot subcarriers to help receiver 150 achieve time and frequency synchronization, and further subcarriers may be used for transmission metadata. On the outsides of each sideband may be a number of guard subcarriers (here drawn as short dotted lines). These are unused subcarriers with zero (or close to zero) amplitude, which help guard against adjacent channel interference. For example, a WiFi IEEE 802.11a OFDM symbol may have 64 subcarriers, including 48 for data, 4 for pilots, and 12 guard subcarriers, most of which are located at the outsides of the sidebands. The symbol may have a duration of 3.2 µs, to which a cyclic guard interval of 0.8 µs is prepended to guard against multipath (i.e., inter-symbol) interference.

For an N-point IFFT, spectrum 300 can include up to N subcarriers, including data subcarriers 211 and one or more power subcarriers 212. This example shows a first, second, and third power subcarrier, but other implementations may have any other number of power subcarriers 212. Power subcarriers 212 may have a different amplitude than data subcarriers 211, for example a higher amplitude. Although in FIG. 3 all power subcarriers are drawn with the same amplitude, in an implementation the amplitude of the power subcarriers may vary. For example, the amplitude of a power subcarrier for a nearby recipient may be smaller than the amplitude of the power carrier for a faraway customer. Spectrum 300 may also include pilot carriers (not separately drawn), which may be at a different amplitude (for example, lower) than data subcarriers 211. An implementation may not use all available subcarriers. For example, to reduce interference with other signals in adjacent frequency bands, an implementation may not use some of the outer subcarriers provided by an inverse Fourier transform.

Figure 4:
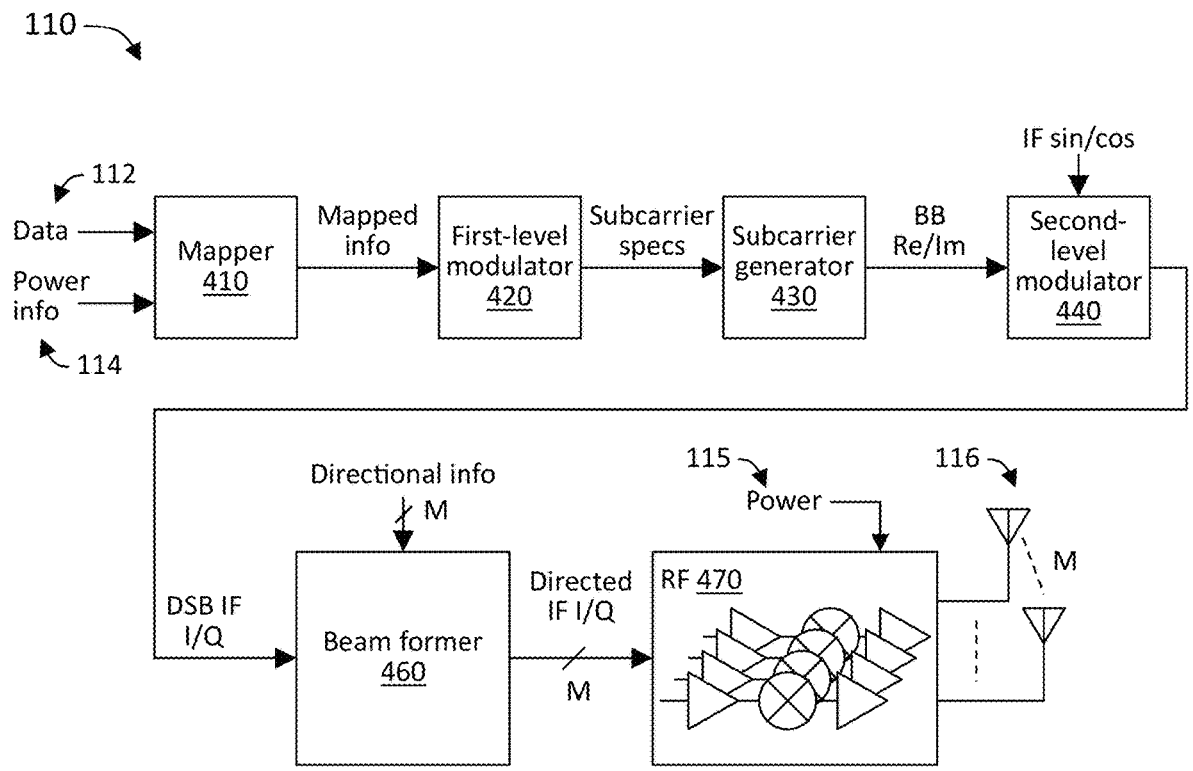
FIG. 4 illustrates an example architecture of the transmitter for double-sideband directed transmission of power and broadband data.

FIG. 4 illustrates an example architecture of transmitter 110 for double-sideband directed transmission of power and broadband data. Transmitter 110 receives data 112 (in data blocks called frames, each frame to be transmitted during one OFDM symbol) and power information 114. Data 112 may have been compressed for efficiency and encrypted for security. It may include separate messages or streams for separate destinations, each of which may have an individual receiver 150. DSB transmission simplifies the architecture needed for transmission and the architecture needed for reception of the data. Whereas DSB transmission uses twice the bandwidth of SSB transmission for the same amount of data, in some applications this may be acceptable.

Data 112 and power information 114 enter mapper 410, whose function is to map data bits in data 112 and metadata in power information 114 to up to N individual subcarriers in the multi-carrier frequency spectrum to be transmitted. Mapper 410 may further define the function and appearance of subcarriers for other use, such as pilot subcarrier, and guard subcarriers. Mapper 410 may also perform other functions such as adding redundancy to the data to allow for error detection and correction, interleaving data bits over non-adjacent subcarriers to combat fixed-frequency interferences, redistributing data bits over time to combat burst interferences such as may be caused by lighting, and convolutional coding or LDPC coding to ease demodulation. Mapper 410 outputs mapped information, i.e. information about every subcarrier for the duration of the OFDM symbol. The mapped information may include the required amplitude and phase of power subcarriers 212 and pilot subcarriers, the data bits to be included in data subcarriers 211, and which of the subcarriers are designated as guard subcarriers. Mapper 410 may work standalone or according to a communications protocol, such as IEEE802.11 or any other protocol.

The first-level modulator 420 receives the mapped information and converts the mapped information to subcarrier specifications. The subcarrier specifications include complex numbers that each define a real and an imaginary component of a subcarrier. For data subcarriers 211, the subcarrier specification is based on the data bits to be transmitted and on the implemented and/or selected modulation scheme, which may be any modulation scheme known in the art, including binary phase shift keying (BPSK), quadrature phase shift keying (QPSK), M-ary phase shift keying (M-ary PSK), quadrature amplitude modulation (QAM, e.g., QAM16, QAM64, QAM256, etc.), pulse-amplitude modulation (PAM), etc.

First-level modulator 420 works in tandem with orthogonal subcarrier generator 430, which receives the subcarrier specifications, generates a baseband real signal (the BB Re signal) and a baseband imaginary signal (the BB Im signal), and outputs these as waveforms (if analog) or as a time-domain series of N successive Re and Im values (if digital) that includes the up to N subcarriers. Orthogonal subcarrier generator 430 may implement an inverse Fourier transform, an N-point IDFT, an N-point IFFT, or any other orthogonal frequency-time (or similar) transform.

The second-level modulator 440 multiplies the BB Re signal with a sine wave of an intermediate frequency (IF) and the BB Im signal with a cosine wave of the intermediate frequency. The multiplications result in amplitude modulation of the BB Re signal into a (DSB) IF I signal and of the BB Im signal into a (DSB) IF Q signal. This modulates the multiple subcarriers onto the real and imaginary components of a single IF carrier.

For example, 63 of the 64 subcarriers of an IEEE 802.11a signal are defined as located symmetrically around the zero frequency at a spacing of 0.3125 MHz between −10 MHz and +10 MHz. However, the subcarriers are not modulated symmetrically, so that a 64-point IFFT outputs both 64 real time samples (the BB Re signal) and 64 imaginary time samples (the BB Im signal). Amplitude modulation of the BB Re signal and the BB Im signal, for example in second-level modulator 440 and with a 25 MHz IF signal, translates the subcarriers to a band from 15 to 35 MHz. Technically, this is a double sideband signal, but the sidebands do not contain the same information because the subcarriers were not modulated symmetrically. However, the amplitude modulation also results in frequency components in the band from −15 to −35 MHz. These components are symmetrical to the frequency components in the band from +15 to +35 MHz. A further translation to an RF frequency (e.g., in RF backend 470) may generate a double-sideband signal, with two sidebands each including the 64 carriers over a band of 20 MHz, unless the signal is further prepared for single-sideband translation as described with reference to FIG. 5.

The beam former 460 receives the IF I signal and the IF Q signal, and directional information for each of M sub-antennas in phased array antenna 116, and modifies the phase and amplitude of the IF I signal and the IF Q signal for each of the M channels that feed phased array antenna 116. It may do so, for example, by multiplying the IF I signal and the IF Q signal with a first complex number for the first channel, with a second complex number for the second channel, with a third complex number for the third channel, and so on. Thus, beam former 460 outputs M directed IF I/Q signals, the results of the M complex multiplications of the IF I and Q signals with the M separate complex numbers for the M channels of phased array antenna 116, where the M separate complex numbers define the directivity of phased array antenna 116 for the final RF transmission frequency. However, at this stage the signals are still at the intermediate frequency. M units of RF backend 470 take the M directed IF I and Q signals, upconvert them to the final RF transmission frequency, combine them into M directed complex RF signals, and provide power amplification to power the M sub-antennas in phased array antenna 116.

Figure 5:
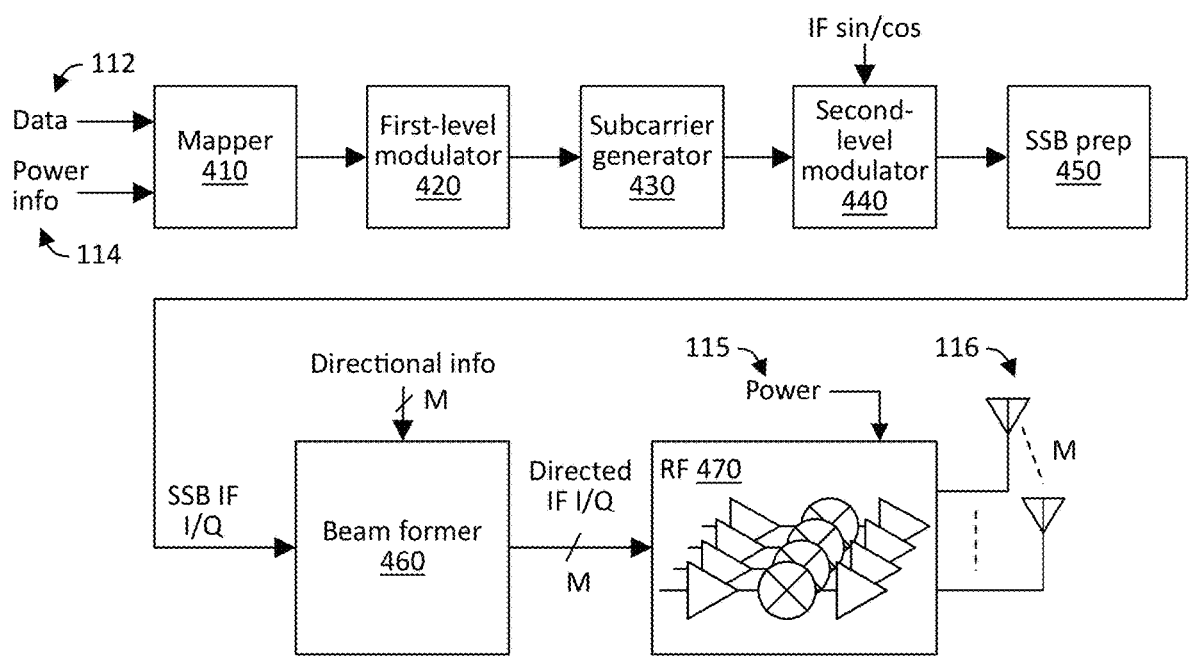
FIG. 5 illustrates an example architecture of the transmitter for single-sideband directed transmission of power and broadband data.

FIG. 5 illustrates an example architecture of transmitter 110 for single sideband (SSB) directed transmission of power and broadband data. The architecture matches the architecture of FIG. 4, with the addition of SSB prep unit 450 between second-level modulator 440 and beam former 460. SSB prep unit 450 is configured to prepare the IF I/Q signal for RF frequency translation resulting in an SSB signal, for example by the technique described with reference to FIG. 7, or by any other technique known in the art.

Figure 6:
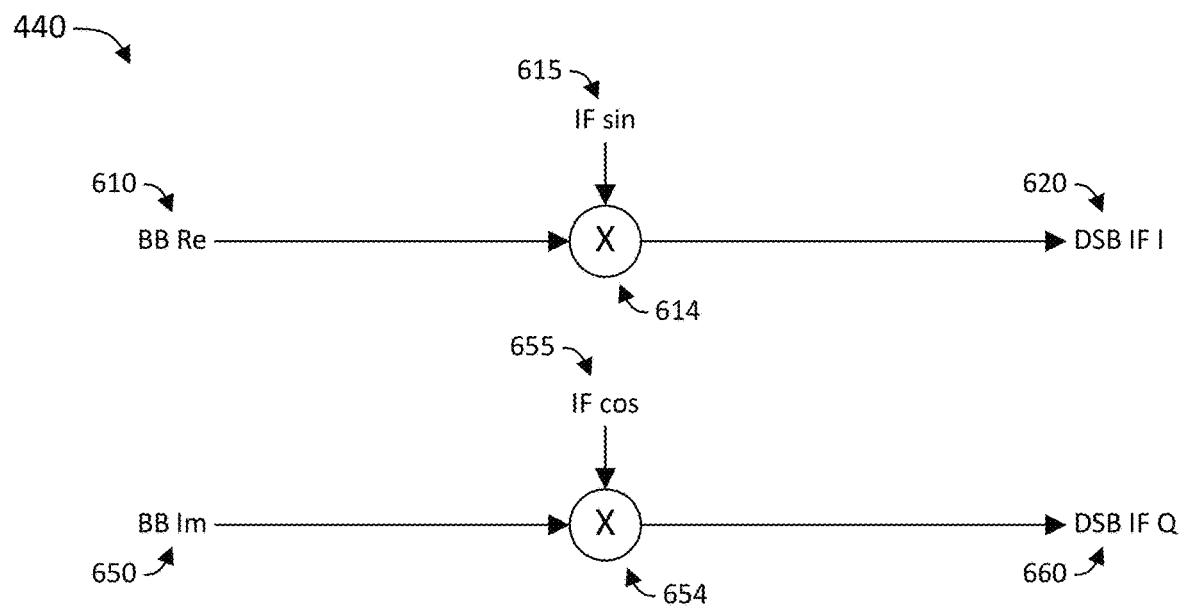
FIG. 6 illustrates an example of a second-level modulator. This second-level modulator provides DSB amplitude modulation for two independent input signals and produces orthogonal output signals.

FIG. 6 illustrates an example implementation of second-level modulator 440. This second-level modulator provides DSB amplitude modulation for two independent input signals and produces two orthogonally modulated output signals. Second-level modulator 440 receives BB Re signal 610 and BB Im signal 650, as well as IF sine wave 615 and IF cosine wave 655. A multiplier 614 multiplies BB Re signal 610 with IF sine wave 615, and multiplier 654 multiplies BB Im signal 650 with IF cosine wave 655 to obtain DSB IF I signal 620 and DSB IF Q signal 660, respectively. Since IF sine wave 615 and IF cosine wave 655 have a phase difference of ninety degrees, they are orthogonal to each other, and even when DSB IF I signal 620 and DSB IF Q signal 660 are summed at some stage, the signals can be individually recovered (demodulated) by parallel multiplication of the summed signal with a sine wave that matches IF sine wave 615 and a cosine wave that matches IF cosine wave 655. The signals DSB IF I signal 620 and DSB IF Q signal 660, which both are real, jointly represent a complex valued signal.

Figure 7:
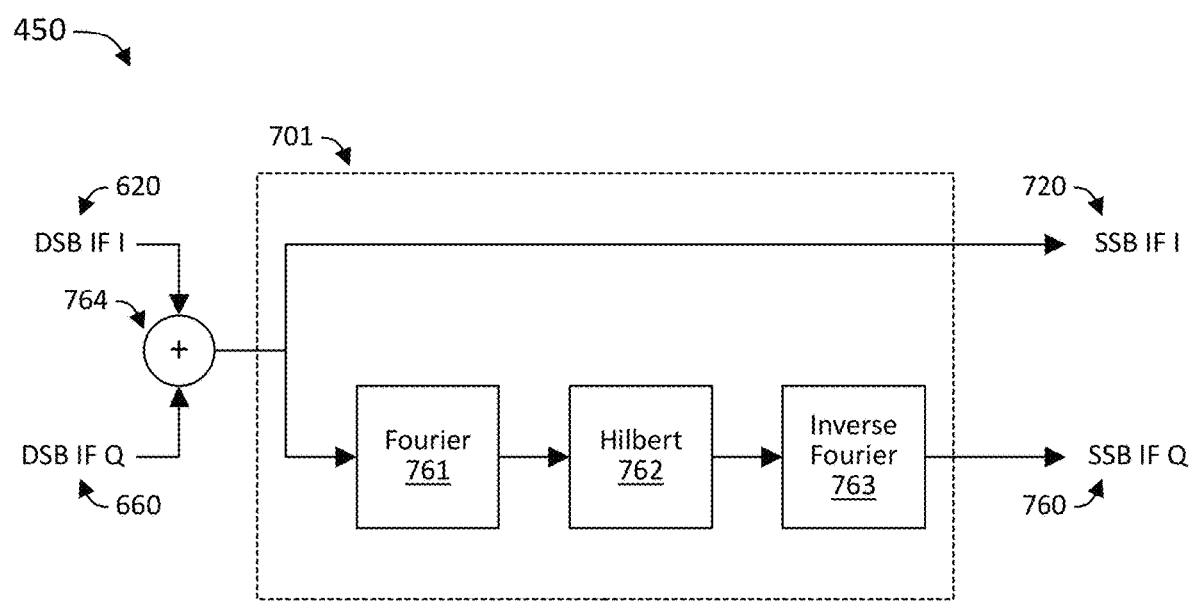
FIG. 7 illustrates an example SSB filter. This digital-domain circuit can take an orthogonal or nonorthogonal input signal and produce orthogonal output signals that can be used as quadrature inputs for beamforming and/or RF translation. Because of its digital nature and relative simplicity, it can remove a sideband even for very high-bandwidth signals.

FIG. 7 illustrates an example implementation of SSB prep unit 450. This digital-domain circuit can take an orthogonal or nonorthogonal input signal and produce orthogonal output signals that can be used as quadrature inputs for beam-forming and/or RF translation. Because of its digital nature and relative simplicity, it can remove a sideband even for very high-bandwidth signals. SSB prep unit 450 receives DSB IF I signal 620 and DSB IF Q signal 660 and adds them in adder 764. The added signals enter Marple's unit 701, which performs functionality ("Marple's method") as described in "Computing the discrete-time 'analytic' signal via FFT," by S. L. Marple Jr, IEEE Transactions on Signal Processing, Volume 47, September 1999, which is incorporated by reference herein, to remove the lower sideband (negative frequencies). Marple's unit 701 outputs the added signals as SSB IF I signal 720, but also performs a Hilbert transform on the added signals. The added signal enters a second path to remove the negative frequencies and scale the positive frequencies, generating the frequency spectrum of an orthogonal output signal, SSB IF Q signal 760. This implementation performs the Hilbert transform in the frequency domain, utilizing, e.g., a Fourier transform 761 or an FFT to obtain the complex frequency spectrum of SSB IF I signal 720. Fourier transform 761 transforms time-domain values from adder 764 into frequency-domain values. Hilbert transform unit 762 processes the frequency components as described by Marple. An inverse Fourier transform 763 or IFFT transforms the remaining frequency-domain values back to time-domain values to obtain SSB IF Q signal 760. Removing negative frequencies results in SSB IF Q signal 760 which together with SSB IF I signal 720 represents a complex valued signal.

Although in the above implementation Hilbert transform unit 762 removes negative frequencies, other implementations may remove positive frequencies, resulting in filtering out the higher sideband instead of the lower sideband.

Figure 8:
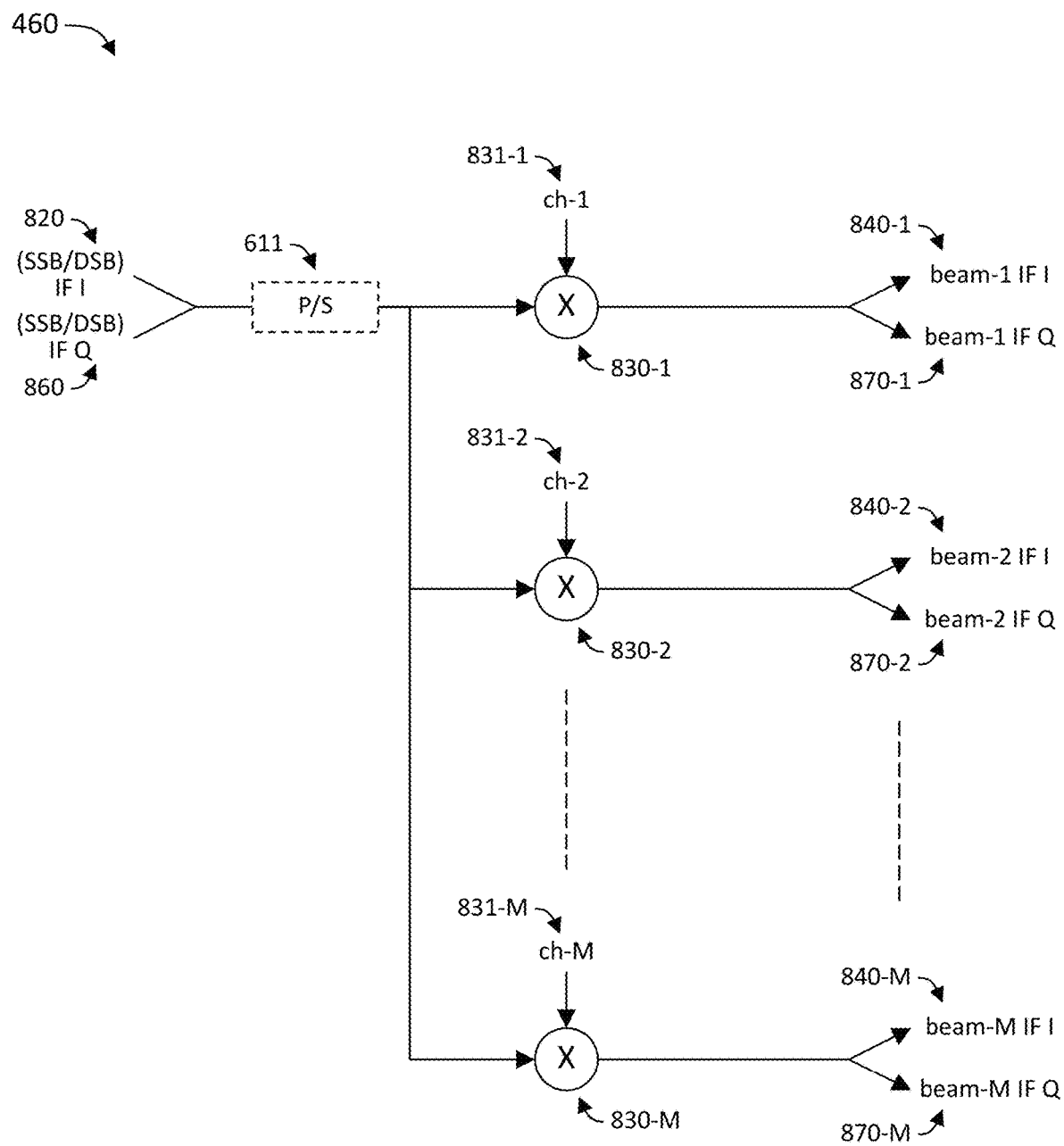
FIG. 8 illustrates an example beam former that operates in the digital domain.

FIG. 8 illustrates an example beam former 460. Beam former 460 receives first IF I signal 820, which may be DSB IF I signal 620 or SSB IF I signal 720, and first IF Q signal 860, which may be DSB IF Q signal 660 or SSB IF Q signal 760. In an implementation in which first IF I signal 820 and first IF Q signal 860 are in parallel format, optional parallel-to-serial converter 611 serializes the I and Q signals. An implementation in which first IF I signal 820 and first IF Q signal 860 are already in serial format does not include parallel-to-serial converter 611. The serialized I and Q signals are forwarded to a bank of M complex multiplier(s) 830-1 . . . M, which also receive directional information 831-1 . . . M. That is, complex multiplier(s) 830-1 receives directional information 831-1, complex multiplier(s) 830-2 receives directional information 831-2, etc. The M complex multipliers thus perform M complex multiplications that change the amplitude and/or phase of first IF I signal 820/first IF Q signal 860 to become M directed IF I signal(s) 840-1 . . . M and M directed IF Q signal(s) 870-1 . . . M for the M channels that feed the M sub-antennas in phased array antenna 116.

Although the implementation of beam former 460 described above uses complex multipliers to create different phase shifts for different sub-antennas, other implementations may use other techniques known in the art, including analog phase filtering, phase changing by using coordinate rotation digital computers (CORDICs), and using other dedicated digital circuits.

Figure 9:
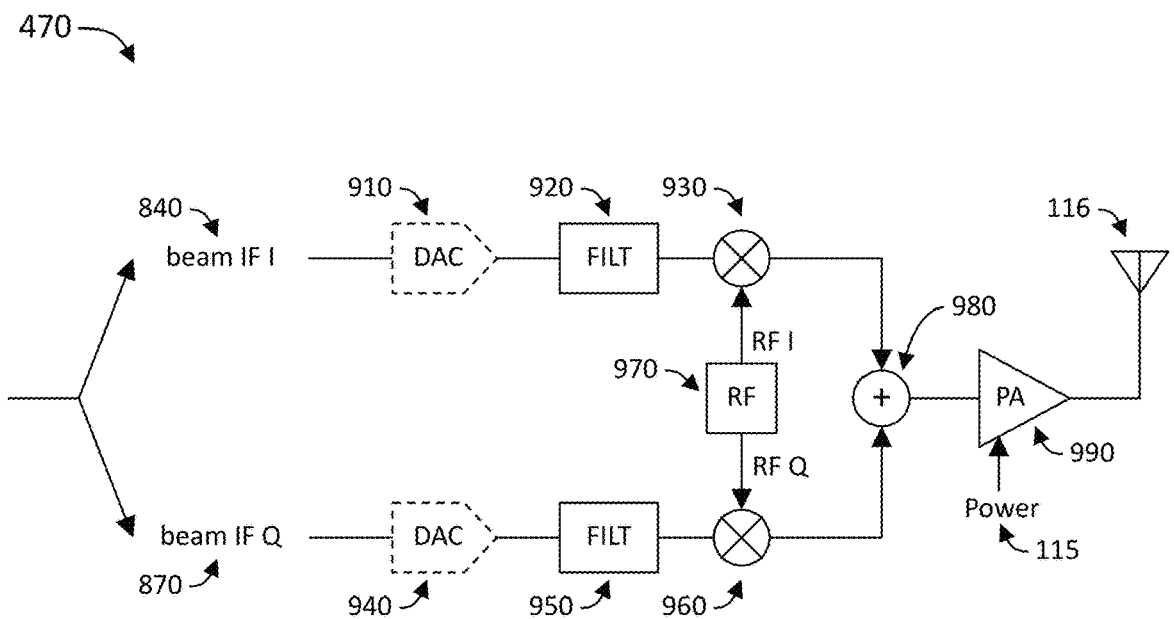
FIG. 9 illustrates an example unit of the radio frequency (RF) backend used to drive a sub-antenna in the phased array antenna. Each sub-antenna requires one unit of the RF backend.

FIG. 9 illustrates an example unit of RF backend 470 used to drive a sub-antenna in phased array antenna 116. Each sub-antenna requires one unit of RF backend 470. The unit receives directed IF I signal(s) 840 and directed IF Q signal(s) 870 which, if digital, DAC 910 and DAC 940 convert to analog signals. Two filters filter 920 and filter 950 coupled with DAC 910 and DAC 940 remove unwanted frequency components from the DAC output signals, and the resulting clean directed analog IF I and Q signals are provided to RF I mixer 930 and RF Q mixer 960, which may be a pair of analog multipliers that also receive an in-phase and quadrature (sine and cosine) version of an RF mixer signal. The RF mixer signals of all units of RF backend 470 may come from a single oscillator 970 to ensure that all sub-antennas receive RF signals that are phase aligned (not considering the directional information encoded in directed IF I signal(s) 840 and directed IF Q signal(s) 870). The mixer output signals may be further filtered to remove unwanted frequency components (filter not shown) and are added in adder 980 which creates a composite RF signal. A power amplifier 990, which receives power 115 as well as the composite RF signal amplifies the composite RF signal and forwards the amplified signal to the associated sub-antenna in phased array antenna 116. The example RF backend shown in FIG. 9 is basic, and many variations and improvements are known in the industry. All such variations and improvements are within the scope and the ambit of the disclosed technology.

While FIG. 1 showed that transmitter 110 receives both power information 114 and power 115, the power information 114 is used to specify power subcarriers 212. The implementation uses power 115 both for the power subcarriers and other subcarriers. In some cases, the power to be transmitted in power subcarriers can be a substantial part of the total power.

Figure 10:
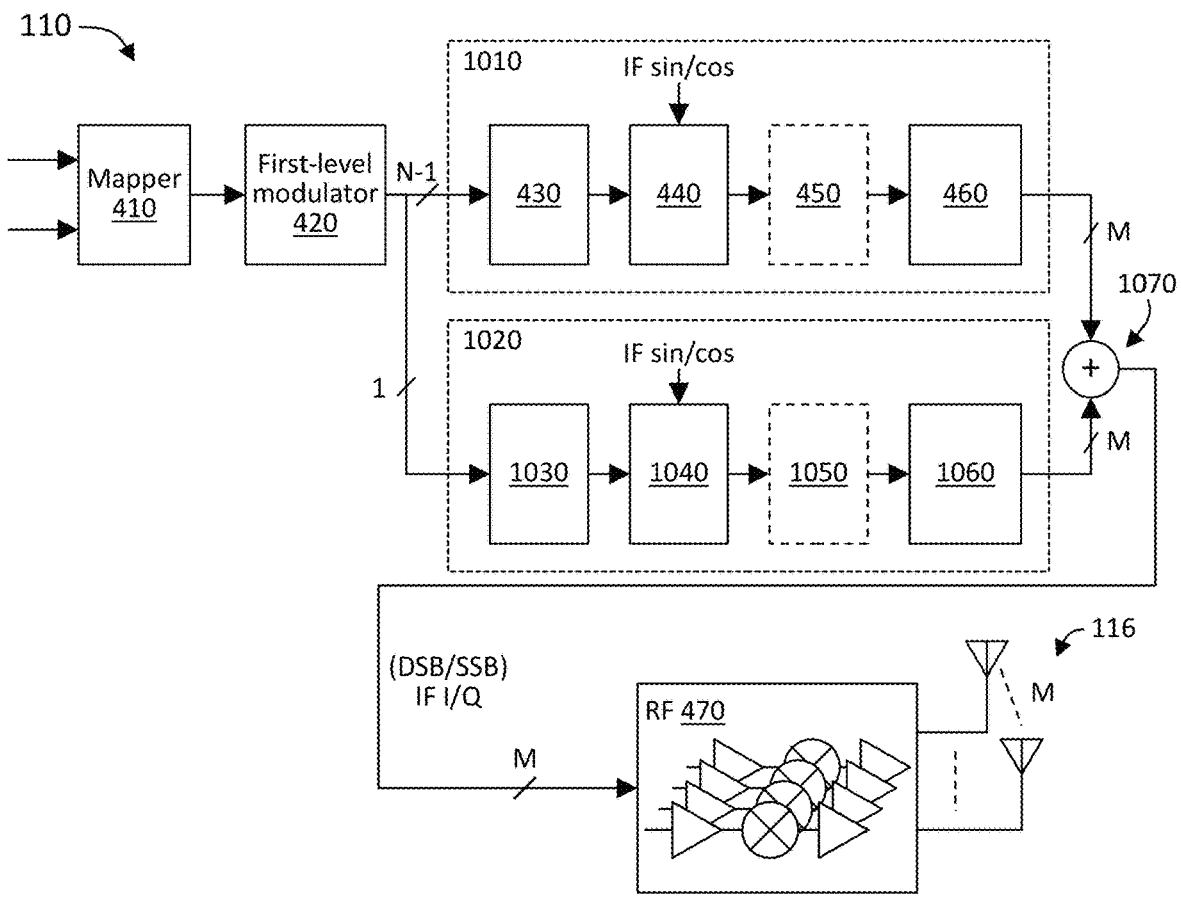
FIG. 10 illustrates an example architecture that can transmit data in one or more directions and power in a separate direction.

FIG. 10 illustrates an example architecture of transmitter 110 that can transmit data (and/or power) in one or more directions and power (or data) in a separate direction. The architecture mirrors the architectures described with reference to FIGS. 4-5 but can independently create and direct multiple beams. A first part of the subcarrier specifications from first-level modulator 420 enters a first path 1010 and a second part of the subcarrier specifications enters a second path 1020. For example, the first part of the subcarrier specifications may cover N−1 subcarriers to transmit with a first directional pattern, and the second part of the subcarrier specifications may cover 1 subcarrier to transmit with a second directional pattern. First path 1010 includes orthogonal subcarrier generator 430, second-level modulator 440, optionally SSB prep unit 450, and beam former 460. The second path 1020 duplicates orthogonal subcarrier generator 430 in orthogonal subcarrier generator 1030, second-level modulator 440 in second-level modulator 1040, optional SSB prep unit 450 in optional SSB prep unit 1050, and beam former 460 in beam former 1060. Beam former 460 delivers M directed IF signals that include the first part of the subcarriers, and beam former 1060 delivers M directed IF signals that include the second part of the subcarriers.

A combiner 1070 adds the M signals from beam former 460 to the M signals from beam former 1060 resulting in M directed IF I/Q signals for the M units of RF backend 470. Depending on whether an implementation includes SSB prep unit 450 and SSB prep unit 1050, these signals may include single or double sidebands. By separating the second part of the subcarrier specifications from the first part of the subcarrier specifications, the implementation is able to direct the second part of the subcarriers totally independent of the first part of the subcarriers. This can be advantageous in situations where, for example, power needs to be directed independently from the data streams. It also provides the possibility of steering the power in a much narrower direction than the data streams. It further provides the possibility to scale the power in, for example, second path 1020 to a larger value without requiring an increased resolution of the circuits in first path 1010, provided that the M units of RF backend 470 can handle the required larger dynamic range.

Although the implementation in FIG. 10 shows two paths (first path 1010 and second path 1020), other implementations may include any number of paths.

Figure 11:
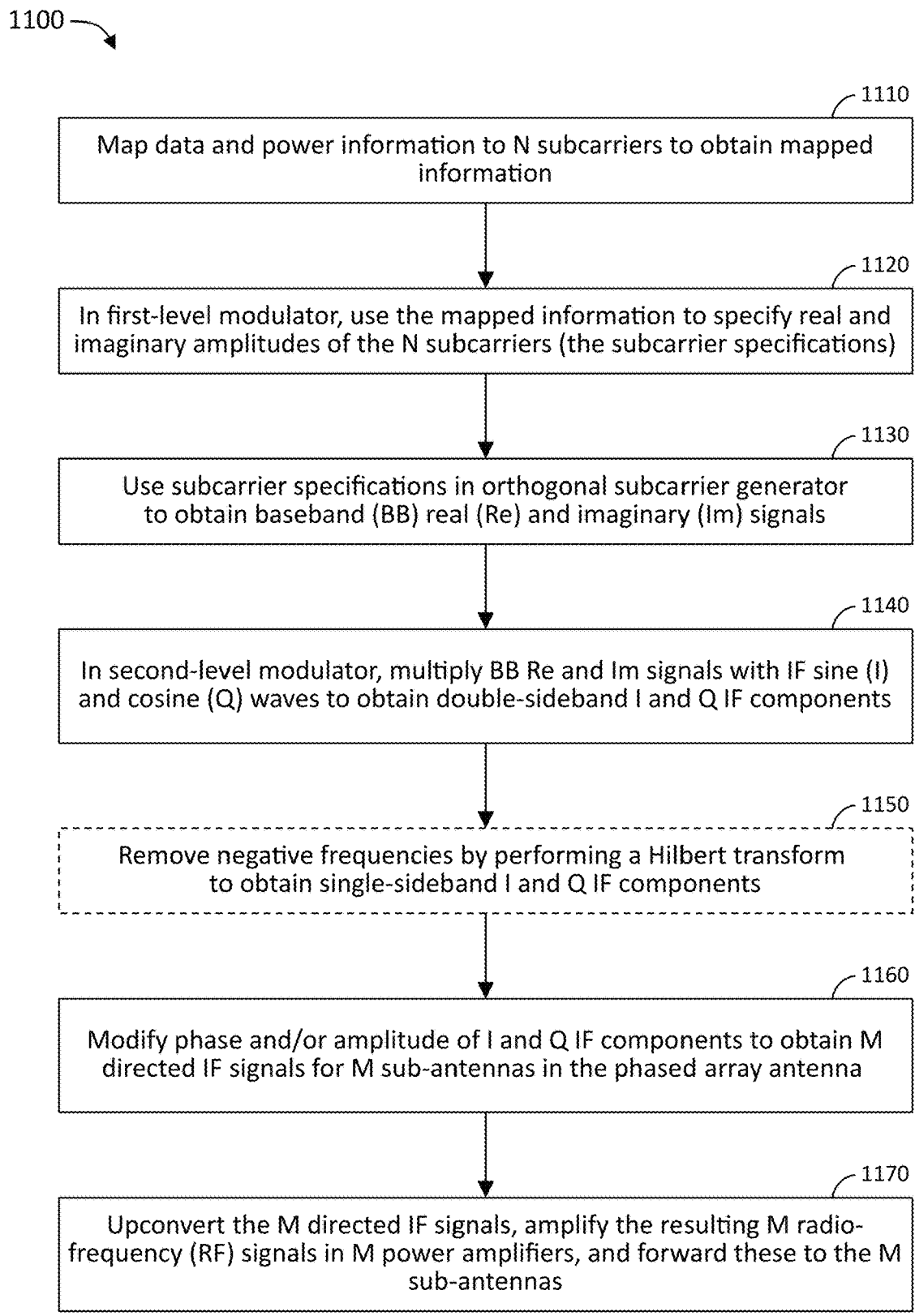
FIG. 11 illustrates an example method of transmitting data and power in one or more target directions. The method uses architectures such as proposed by FIGS. 4 and 5.

FIG. 11 illustrates an example method 1100 of transmitting data and power in one or more target directions. Method 1100 uses architectures such as proposed by FIGS. 4 and 5. Method 1100 includes:

1110—in a mapper (e.g., mapper 410), mapping data and power information to N subcarriers to obtain mapped information. N is an integer greater than 1.

1120—in a first-level modulator (e.g., first-level modulator 420), using the mapped information to determine subcarrier specifications. The subcarrier specifications may include real and imaginary amplitudes of the subcarriers. The subcarrier specifications may be based on any modulation method (constellation), including BPSK, QPSK, M-ary PSK, QAM, PAM, etc.

1130—in an orthogonal subcarrier generator (e.g., orthogonal subcarrier generator 430), receiving the subcarrier specifications and calculating N successive complex values of a baseband real signal (the BB Re signal) and of a baseband imaginary signal (the BB Im signal). The orthogonal subcarrier generator may be or include or perform an inverse Fourier transform, an IDFT, an IFFT, or any other transform.

1140—in a second-level modulator (e.g., second-level modulator 440), receiving the BB Re signal and the BB Im signal and multiplying the BB Re signal with an in-phase IF sine wave and multiplying the BB Im signal with a quadrature IF cosine wave to obtain an IF I signal and an IF Q signal, respectively, of an AM IF signal.

1150—(optional) in a single-sideband prep unit (e.g., SSB prep unit 450), removing negative frequencies (performing a Hilbert transform). An implementation may perform Marple's method (as described with reference to FIG. 7) to remove negative frequencies.

1160—in a beam former (e.g., beam former 460), receiving the IF I signal and the IF Q signal and modifying a phase and/or an amplitude of the IF I signal and the IF Q signal for a first sub-antenna to obtain a first directed IF signal and modifying the phase and/or an amplitude of the IF I signal and the IF Q signal for a second sub-antenna to obtain a second directed IF signal. More generally, the implementation may generate M sets of directed IF signals for M sub-antennas in a phased array antenna.

1170—in an RF backend (e.g., RF backend 470) upconverting the first directed IF signal, amplifying the resulting first RF sub-antenna signal, and forwarding it to a first sub-antenna, and upconverting the second directed IF signal, amplifying the resulting second RF sub-antenna signal, and forwarding it to a second sub-antenna.

Figure 12:
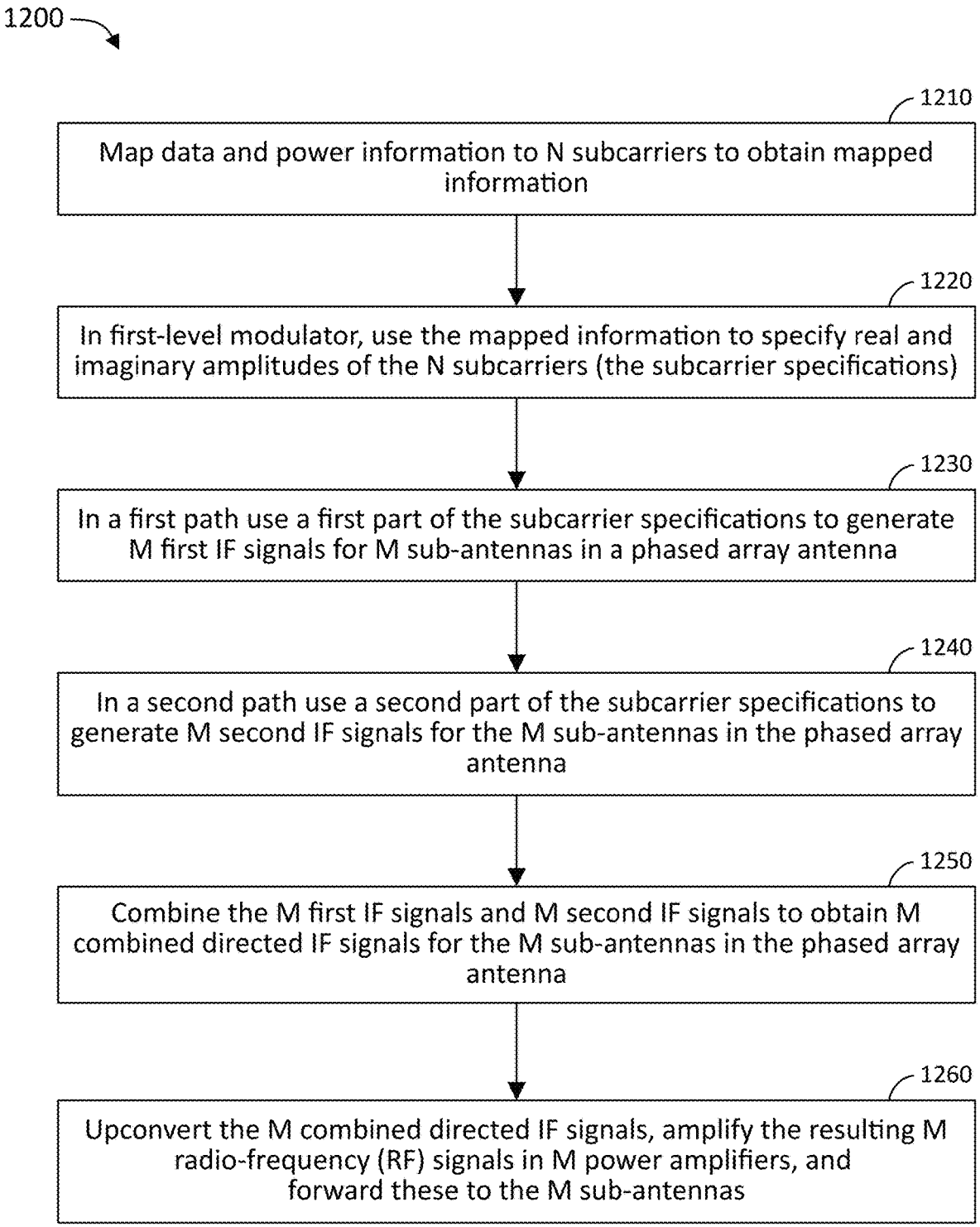
FIG. 12 illustrates an example method of transmitting data in a first direction and power in a second direction. The method uses architectures such as proposed by FIG. 10.

FIG. 12 illustrates an example method 1200 of transmitting data in a first direction and power in a second direction. More generally, method 1200 can be used to independently send data and/or power in multiple directions. Method 1200 uses architectures such as proposed in FIG. 10. Method 1200 comprises:

1210—in a mapper (e.g., mapper 410), mapping data and power information to N subcarriers to obtain mapped information. N is an integer greater than 1.

1220—in a first-level modulator (e.g., first-level modulator 420), using the mapped information to determine subcarrier specifications. The subcarrier specifications may include real and imaginary amplitudes of the subcarriers. The subcarrier specifications may be based on any modulation method (constellation), including BPSK, QPSK, M-ary PSK, QAM, PAM, etc.

1230—in a first path, receiving a first part of the subcarrier specifications and determining M first directed IF signals for M sub-antennas in a phased array antenna. The first path includes a first orthogonal subcarrier generator (e.g., orthogonal subcarrier generator 430), a first second-level modulator (e.g., second-level modulator 440), and a first beamformer (e.g., beam former 460). M is an integer greater than 1, and the M first directed IF signals include phase and/or amplitude information to send data in the first direction. The first path may also include a first SSB prep unit, for example SSB prep unit 450. The implementation may determine the M first directed IF signals from the first part of the subcarrier specifications as described with reference to method 1100, operations 1130 through 1160.

1240—in a second path, receiving a second part of the subcarrier specifications and determining M second directed IF signals for the M sub-antennas in the phased array antenna. The second path includes a second orthogonal subcarrier generator (e.g., orthogonal subcarrier generator 1030), a second second-level modulator (e.g., second-level modulator 1040), and a second beamformer (e.g., beam former 1060). The M second directed IF signals include phase and/or amplitude information to send data in the second direction. The second path may also include a second SSB prep unit, for example SSB prep unit 1050. The implementation may determine the M second directed IF signals from the second part of the subcarrier specifications as described with reference to method 1100, operations 1130 through 1160.

- 1250—using M complex adders (e.g., combiner 1070) to combine the M first directed IF signals and the M second directed IF signals and obtain M combined directed IF signals.
- 1260—upconverting the M combined directed IF signals to M radio-frequency signals (RF signals), amplifying the M RF signals in M power amplifiers, and forward resulting amplified RF signals to the M sub-antennas in the phased array antenna.

Particular Implementations

Described implementations of the subject matter can include one or more features, alone or in combination, as described in the following clauses.

Clause 1. A transmitter, comprising:
- a mapper configured to map data bits and power information to N subcarriers to obtain mapped information, wherein N is an integer larger than 1;
- a first-level modulator configured to receive at least a first part of the mapped information and convert the at least the first part of the mapped information into at least a first part of subcarrier specifications, the subcarrier specifications including a complex number that defines an amplitude and a phase of a subcarrier;
- a first orthogonal subcarrier generator configured to receive the at least the first part of the subcarrier specifications, and configured to generate a first baseband real signal (a first BB Re signal) and a first baseband imaginary signal (a first BB Im signal) that include at least a first part of the N subcarriers;
- a first second-level modulator configured to receive the first BB Re signal and the first BB Im signal and to multiply the first BB Re signal with an in-phase intermediate frequency (IF) sine wave and to multiply the first BB Im signal with a quadrature IF cosine wave to obtain a first IF I signal and a first IF Q signal; and
- a first beam former configured to receive the first IF I signal and the first IF Q signal and to modify a phase and/or an amplitude of the first IF I signal and the first IF Q signal to obtain a first directed IF I signal and a first directed IF Q signal and to modify the phase and/or the amplitude of the first IF I signal and the first IF Q signal to obtain a second directed IF I signal and a second directed IF Q signal.

Clause 2. The transmitter of clause 1, wherein the data bits have a bandwidth of more than one hundred megabits per second (100 Mbps) and wherein the first IF I signal and the first IF Q signal occupy a spectrum of at least ten megahertz (10 MHz).

Clause 3. The transmitter of clause 1 or clause 2, wherein the first orthogonal subcarrier generator includes an inverse fast Fourier transform (IFFT) circuit.

Clause 4. The transmitter of any of the clauses 1 to 3, further comprising a first single-sideband prep unit (a first SSB prep unit) configured to remove either negative or positive frequency components from the first IF I signal and the first IF Q signal.

Clause 5. The transmitter of any of the clauses 1 to 4, wherein the first SSB prep unit includes:
- a fast Fourier transform (FFT) circuit configured to transform time-domain values in the first IF I signal and the first IF Q signal to frequency-domain values;
- a Hilbert transform unit configured to negate part of the frequency-domain values related to negative frequencies; and
- an SSB prep unit IFFT circuit configured to transform the frequency-domain values to time-domain values.

Clause 6. The transmitter of any of the clauses 1 to 5, wherein the FFT circuit, the Hilbert transform unit and the SSB prep unit IFFT circuit are configured to perform Marple's method and the first SSB prep unit outputs both an in-phase IF signal and a quadrature IF signal.

Clause 7. The transmitter of any of the clauses 1 to 6, further comprising:
- a first digital-to-analog converter (a first DAC) to convert the first directed IF I signal from a digital domain to an analog domain; and
- a second DAC to convert the first directed IF Q signal from the digital domain to the analog domain.

Clause 8. The transmitter of any of the clauses 1 to 7, further comprising:
- a second orthogonal subcarrier generator configured to receive a second part of the subcarrier specifications, and configured to generate a second baseband in-phase signal (a second BB I signal) and a second baseband quadrature signal (a second BB Q signal) that include a second part of the N subcarriers;
- a second second-level modulator configured to receive the second BB I signal and the second BB Q signal and to multiply the second BB I signal with the in-phase IF sine wave and to multiply the second BB Q signal with the quadrature IF cosine wave to obtain a second IF I signal and a second IF Q signal; and
- a second beam former configured to receive the second IF I signal and the second IF Q signal and to modify a phase and/or an amplitude of the second IF I signal and the second IF Q signal to obtain a third directed IF I signal and a third directed IF Q signal and to modify the phase and/or the amplitude of the second IF I signal and the second IF Q signal to obtain a fourth directed IF I signal and a fourth directed IF Q signal.

Clause 9. The transmitter of any of the clauses 1 to 8, further comprising:
- a second first-level modulator configured to receive a second part of the mapped information and convert the second part of the mapped information into the second part of the subcarrier specifications.

Clause 10. A method of transmitting data and power in one or more target directions, comprising:
- in a mapper, mapping data and power information to N subcarriers to obtain mapped information, wherein N is an integer greater than 1;
- in a first-level modulator, using the mapped information to determine subcarrier specifications;
- in an orthogonal subcarrier generator, receiving the subcarrier specifications and calculating N successive complex values including a baseband real signal (a BB Re signal) and a baseband imaginary signal (a BB Im signal);
- in a second-level modulator, receiving the BB Re signal and the BB Im signal and multiplying the BB Re signal with an in-phase IF sine wave and multiplying the BB Im signal with a quadrature IF cosine wave to obtain an IF I signal and an IF Q signal, respectively; and
- in a beam former, receiving the IF I signal and the IF Q signal and modifying a phase and/or an amplitude of the IF I signal and the IF Q signal to obtain a first directed IF signal and modifying the phase and/or the amplitude of the IF I signal and the IF Q signal to obtain a second directed IF signal.

Clause 11. The method of clause 10, further comprising:
- in a single-sideband prep unit (a first SSB prep unit), modifying the IF I signal and/or the IF Q signal to remove negative frequency components.

Clause 12. A method of transmitting data in a first direction and power in a second direction, comprising:
- in a mapper, mapping data and power information to N subcarriers to obtain mapped information, wherein N is an integer greater than 1;
- in a first-level modulator, using the mapped information to determine subcarrier specifications;
- in a first path, receiving a first part of the subcarrier specifications and generating M first directed IF signals for M sub-antennas in a phased array antenna, wherein:
  - M is an integer greater than 1;
  - the first path includes a first orthogonal subcarrier generator, a first second-level modulator, and a first beamformer; and
  - the M first directed IF signals include phase and/or amplitude information to send first data in the first direction;
- in a second path, receiving a second part of the subcarrier specifications and generating M second directed IF signals for the M sub-antennas in the phased array antenna, wherein:
  - the second path includes a second orthogonal subcarrier generator, a second second-level modulator, and a second beamformer; and
  - the M second directed IF signals include phase and/or amplitude information to send second data in the second direction;
- using M complex adders to combine the M first directed IF signals and the M second directed IF signals and obtain M combined directed IF signals; and
- upconverting the M combined directed IF signals to M radio-frequency signals (M RF signals), amplifying the M RF signals in M power amplifiers, and forward resulting amplified RF signals to the M sub-antennas in the phased array antenna.

Clause 13. The method of clause 12, wherein the first path further comprises a first SSB prep unit and the second path further comprises a second SSB prep unit.

Clause 14. The method of clause 12 or clause 13, wherein the first data and/or the second data includes at least a part of the power information.

Considerations

We describe various implementations of systems and methods to transmit a combination of broadband data and harvestable power in one or more targeted directions.

The technology disclosed can be practiced as a system, apparatus, or method. One or more features of an implementation can be combined with a base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to specific implementations thereof, these specific implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above. For example, many of the individual functions described are well known in the art, and many different and improved implementations of these functions exist that all fall within the ambit and scope of the disclosed technology. The functions can be implemented as analog circuits on an IC, module, or printed circuit board (PCB), mixed-signal circuits on an IC, module, or PCB, digital circuits on an IC, module, or PCB, configurations of a field-programmable gate array (FPGA), firmware for optimized digital signal processors (DSPs), or software for general-purpose processors. Implementations may be as a single chip, or as a multi-chip module (MCM) packaging multiple semiconductor dies in a single package. All such variations and modifications are to be considered within the ambit of the disclosed technology, the nature of which is to be determined from the foregoing description.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Any suitable technology for manufacturing electronic devices can be used to implement the circuits of specific implementations, including CMOS, FinFET, GAAFET, BiCMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different specific implementations. In some specific implementations, multiple elements, devices, or circuits shown as sequential in this specification can be operating in parallel.

It will also be appreciated that one or more of the elements depicted in the drawings/figures can also be implemented in a more separated or integrated manner, or even removed or rendered as inoperable in certain cases, as is useful in accordance with a particular application.

Thus, while specific implementations have been described herein, latitudes of modification, various changes, and substitutions are intended in the foregoing disclosures, and it will be appreciated that in some instances some features of specific implementations will be employed without a corresponding use of other features without departing from the scope and spirit as set forth. Therefore, many modifications may be made to adapt a particular situation or material to the essential scope and spirit.

The invention claimed is:

1. A transmitter, comprising:
- a mapper configured to map data bits and power information to N subcarriers to obtain mapped information, wherein N is an integer larger than 1;
- a first-level modulator configured to receive at least a first part of the mapped information and convert the at least the first part of the mapped information into at least a first part of subcarrier specifications, the subcarrier specifications including a complex number that defines an amplitude and a phase of a subcarrier;

a first orthogonal subcarrier generator configured to receive the at least the first part of the subcarrier specifications, and configured to generate a first baseband real signal (a first BB Re signal) and a first baseband imaginary signal (a first BB Im signal) that include at least a first part of the N subcarriers;

a first second-level modulator configured to receive the first BB Re signal and the first BB Im signal and to multiply the first BB Re signal with an in-phase intermediate frequency (IF) sine wave and to multiply the first BB Im signal with a quadrature IF cosine wave to obtain a first IF I signal and a first IF Q signal; and a first beam former configured to receive the first IF I signal and the first IF Q signal and to modify a phase and/or an amplitude of the first IF I signal and the first IF Q signal to obtain a first directed IF I signal and a first directed IF Q signal and to modify the phase and/or the amplitude of the first IF I signal and the first IF Q signal to obtain a second directed IF I signal and a second directed IF Q signal.

2. The transmitter of claim 1, wherein the data bits have a bandwidth of more than one hundred megabits per second (100 Mbps) and wherein the first IF I signal and the first IF Q signal occupy a spectrum of at least ten megahertz (10 MHz).

3. The transmitter of claim 1, wherein the first orthogonal subcarrier generator includes an inverse fast Fourier transform (IFFT) circuit.

4. The transmitter of claim 1, further comprising a first single-sideband prep unit (a first SSB prep unit) configured to remove either negative or positive frequency components from the first IF I signal and the first IF Q signal.

5. The transmitter of claim 4, wherein the first SSB prep unit includes:

a fast Fourier transform (FFT) circuit configured to transform time-domain values in the first IF I signal and the first IF Q signal to frequency-domain values;

a Hilbert transform unit configured to negate part of the frequency-domain values related to negative frequencies; and an SSB prep unit IFFT circuit configured to transform the frequency-domain values to time-domain values.

6. The transmitter of claim 5, wherein the FFT circuit, the Hilbert transform unit and the SSB prep unit IFFT circuit are configured to perform Marple's method and the first SSB prep unit outputs both an in-phase IF signal and a quadrature IF signal.

7. The transmitter of claim 1, further comprising:

a first digital-to-analog converter (a first DAC) to convert the first directed IF I signal from a digital domain to an analog domain; and a second DAC to convert the first directed IF Q signal from the digital domain to the analog domain.

8. The transmitter of claim 1, further comprising:

a second orthogonal subcarrier generator configured to receive a second part of the subcarrier specifications, and configured to generate a second baseband in-phase signal (a second BB I signal) and a second baseband quadrature signal (a second BB Q signal) that include a second part of the N subcarriers;

a second second-level modulator configured to receive the second BB I signal and the second BB Q signal and to multiply the second BB I signal with the in-phase IF sine wave and to multiply the second BB Q signal with the quadrature IF cosine wave to obtain a second IF I signal and a second IF Q signal; and a second beam former configured to receive the second IF I signal and the second IF Q signal and to modify a phase and/or an amplitude of the second IF I signal and the second IF Q signal to obtain a third directed IF I signal and a third directed IF Q signal and to modify the phase and/or the amplitude of the second IF I signal and the second IF Q signal to obtain a fourth directed IF I signal and a fourth directed IF Q signal.

9. The transmitter of claim 8, further comprising:

a second first-level modulator configured to receive a second part of the mapped information and convert the second part of the mapped information into the second part of the subcarrier specifications.

10. A method of transmitting data and power in one or more target directions, comprising:

in a mapper, mapping data and power information to N subcarriers to obtain mapped information, wherein N is an integer greater than 1;

in a first-level modulator, using the mapped information to determine subcarrier specifications;

in an orthogonal subcarrier generator, receiving the subcarrier specifications and calculating N successive complex values including a baseband real signal (a BB Re signal) and a baseband imaginary signal (a BB Im signal);

in a second-level modulator, receiving the BB Re signal and the BB Im signal and multiplying the BB Re signal with an in-phase IF sine wave and multiplying the BB Im signal with a quadrature IF cosine wave to obtain an IF I signal and an IF Q signal, respectively; and in a beam former, receiving the IF I signal and the IF Q signal and modifying a phase and/or an amplitude of the IF I signal and the IF Q signal to obtain a first directed IF signal and modifying the phase and/or the amplitude of the IF I signal and the IF Q signal to obtain a second directed IF signal.

11. The method of claim 10, further comprising:

in a single-sideband prep unit (a first SSB prep unit), modifying the IF I signal and/or the IF Q signal to remove negative frequency components.

12. A method of transmitting data in a first direction and power in a second direction, comprising:

in a mapper, mapping data and power information to N subcarriers to obtain mapped information, wherein N is an integer greater than 1;

in a first-level modulator, using the mapped information to determine subcarrier specifications;

in a first path, receiving a first part of the subcarrier specifications and generating M first directed IF signals for M sub-antennas in a phased array antenna, wherein:
M is an integer greater than 1;
the first path includes a first orthogonal subcarrier generator, a first second-level modulator, and a first beamformer; and
the M first directed IF signals include phase and/or amplitude information to send first data in the first direction;

in a second path, receiving a second part of the subcarrier specifications and generating M second directed IF signals for the M sub-antennas in the phased array antenna, wherein:
the second path includes a second orthogonal subcarrier generator, a second second-level modulator, and a second beamformer; and the M second directed IF signals include phase and/or amplitude information to send second data in the second direction;

using M complex adders to combine the M first directed IF signals and the M second directed IF signals and obtain M combined directed IF signals; and upconverting the M combined directed IF signals to M radio-frequency signals (M RF signals), amplifying the M RF signals in M power amplifiers, and forward resulting amplified RF signals to the M sub-antennas in the phased array antenna.

13. The method of claim 12, wherein the first path further comprises a first single-sideband (SSB) prep unit and the second path further comprises a second SSB prep unit.

14. The method of claim 12, wherein the first data and/or the second data includes at least a part of the power information.

* * * * *